United States Patent
Takeuchi et al.

(10) Patent No.: US 8,741,123 B2
(45) Date of Patent: Jun. 3, 2014

(54) WATER ELECTROLYSIS SYSTEM AND METHOD FOR SHUTTING DOWN THE SAME

(75) Inventors: Jun Takeuchi, Wako (JP); Masanori Okabe, Wako (JP); Hisashi Nagaoka, Wako (JP); Koji Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 712 days.

(21) Appl. No.: 13/008,916

(22) Filed: Jan. 19, 2011

(65) Prior Publication Data

US 2011/0198235 A1    Aug. 18, 2011

(30) Foreign Application Priority Data

Feb. 12, 2010    (JP) .................................. 2010-029179

(51) Int. Cl.
*C25B 1/10* (2006.01)
(52) U.S. Cl.
USPC ............ 205/743; 205/628; 205/633; 205/637
(58) Field of Classification Search
USPC ........... 205/743, 628, 633, 637; 204/266, 278
See application file for complete search history.

(56) References Cited

FOREIGN PATENT DOCUMENTS

| JP | 07-286293 | * | 10/1995 |
|---|---|---|---|
| JP | 07-286293 | A | 10/1995 |
| JP | 2006-131942 | | 5/2006 |
| JP | 2006-131957 | * | 5/2006 |
| JP | 2006-131957 | A | 5/2006 |

OTHER PUBLICATIONS

Japanese Office Action for corresponding JP Application No. 2010-029179, Feb. 2, 2012.

* cited by examiner

*Primary Examiner* — Arun S Phasge
(74) *Attorney, Agent, or Firm* — Ditthavong Mori & Steiner, P.C.

(57) ABSTRACT

A water electrolysis system includes a water electrolysis apparatus including an electrolyte membrane. The electrolyte membrane is provided between an anode and a cathode. The water electrolysis apparatus is configured to generate oxygen on a side of the anode and hydrogen on a side of the cathode at a pressure higher than a pressure of the oxygen through electrolysis of water. A gas-liquid separation apparatus separates unreacted water and produced gas discharged from a water outlet of the water electrolysis apparatus. A water circulation apparatus circulates the water between the water electrolysis apparatus and the gas-liquid separation apparatus. The water circulation apparatus includes a return pipe having an on-off valve and connecting the water outlet and the gas-liquid separation apparatus. A hydrogen exhaust pipe is connected to the return pipe between the water outlet and the on-off value and extends upward from the water electrolysis apparatus.

4 Claims, 4 Drawing Sheets

WATER ELECTROLYSIS SYSTEM AND METHOD FOR SHUTTING DOWN THE SAME

CROSS-REFERENCE TO RELATED APPLICATIONS

The present application claims priority under 35 U.S.C. §119 to Japanese Patent Application No. 2010-029179 filed in the Japan Patent Office on Feb. 12, 2010, entitled "Water Electrolysis System and Method for Shutting Down the Same". The contents of this application are incorporated herein by reference in their entirety.

BACKGROUND OF THE INVENTION

1. Field of the Invention

The present invention relates to a water electrolysis system and a method for shutting down the system.

2. Description of the Related Art

For example, a solid polymer electrolyte fuel cell generates direct-current electric energy by supplying a fuel gas (gas mainly containing hydrogen, for example, hydrogen gas) to the anode-side electrode and an oxidizer gas (gas mainly containing oxygen, for example, air) to the cathode-side electrode.

In order to produce hydrogen gas as the fuel gas, a water electrolysis apparatus is generally used. The water electrolysis apparatus uses a solid polymer electrolyte membrane (ion-exchange membrane) for generating hydrogen (and oxygen) by water decomposition. In addition, electrode catalyst layers are provided on both surfaces of the solid polymer electrolyte membrane to form an electrolyte membrane/electrode assembly. Further, power feeders are disposed on both sides of the electrolyte membrane/electrode assembly to form a unit. That is, the unit has substantially the same configuration as the fuel cell.

Therefore, in a stack of a plurality of units, a voltage is applied across both ends in the stacking direction, and water is supplied to the anode-side power feeder. As a result, hydrogen ions (protons) are generated by water decomposition on the anode side of the electrolyte membrane/electrode assembly, and the hydrogen ions permeate through the solid polymer electrolyte membrane, move to the cathode side, and combine with electrons to produce hydrogen. On the other hand, on the anode side, oxygen produced together with hydrogen ions (protons) is discharged from the unit accompanied by excess water.

A hydrogen supply system disclosed in, for example, Japanese Unexamined Patent Application Publication No. 2006-131942 is known as such a type of water electrolysis system. The hydrogen supply system is provided with at least one hydrogen/oxygen generator configured to have an electrolysis cell in which the anode side and the cathode side are separated by a diaphragm so that hydrogen gas is generated on the cathode side and oxygen gas is generated on the anode side by electrolysis of water supplied to the electrolysis cell.

In addition, the hydrogen supply system is configured so that at least the hydrogen gas of the hydrogen gas and oxygen gas generated by the hydrogen/oxygen generator can be supplied to a point of use, and the pressure of the hydrogen gas generated at lower pressure than that of the oxygen gas in the system can be increased by the oxygen gas generated on the anode side of the electrolysis cell of the hydrogen/oxygen generator.

However, the above-described hydrogen supply system may employ a differential pressure-type hydrogen generation system in which the pressure on the cathode side where hydrogen gas is generated is set to be higher than the pressure of the anode side where oxygen gas is generated. This is because rapid hydrogen supply can be easily performed by handling as high-pressure hydrogen gas.

In this differential pressure-type hydrogen generation system, when electrolysis is stopped, high-pressure hydrogen gas is present on the cathode side, while normal-pressure water and oxygen gas are present on the anode side. Therefore, hydrogen easily permeates through the diaphragm and moves from the cathode side to the anode side during the time when the pressure on the cathode side is slowly released for preventing damage to a seal and MEA (Membrane Electrode Assembly) after electrolysis is stopped (so-called cross leak).

SUMMARY OF THE INVENTION

According to one aspect of the present invention, a water electrolysis system includes a water electrolysis apparatus, a gas-liquid separation apparatus, and a water circulation apparatus. The water electrolysis apparatus includes a power supply, an anode, a cathode, and an electrolyte membrane. The anode is connected to the power supply. The cathode is connected to the power supply. The electrolyte membrane is provided between the anode and the cathode. The water electrolysis apparatus is configured to generate oxygen on a side of the anode and to generate hydrogen on a side of the cathode at a pressure higher than a pressure of the oxygen through electrolysis of water. The gas-liquid separation apparatus separates unreacted water and produced gas discharged from a water outlet of the water electrolysis apparatus. The water circulation apparatus circulates the water between the water electrolysis apparatus and the gas-liquid separation apparatus. The water circulation apparatus includes a return pipe and a hydrogen exhaust pipe. The return pipe has an on-off valve and connects the water outlet of the water electrolysis apparatus and the gas-liquid separation apparatus. The hydrogen exhaust pipe is connected to the return pipe between the water outlet and the on-off value and extends upward from the water electrolysis apparatus.

According to another aspect of the present invention, a method for shutting down a water electrolysis system includes shutting down a water electrolysis apparatus while shutting down a water circulation apparatus and closing a on-off valve while opening a exhaust valve. The water electrolysis system includes the water electrolysis apparatus, a gas-liquid separation apparatus, and the water circulation apparatus. The water electrolysis apparatus includes a power supply, an anode, a cathode, and an electrolyte membrane. The anode is connected to the power supply. The cathode is connected to the power supply. The electrolyte membrane is provided between the anode and the cathode. The water electrolysis apparatus is configured to generate oxygen on a side of the anode side and to generate hydrogen on a side of the cathode at a pressure higher than a pressure of the oxygen through electrolysis of water. The gas-liquid separation apparatus separates unreacted water and produced gas discharged from a water outlet of the water electrolysis apparatus. The water circulation apparatus circulates the water between the water electrolysis apparatus and the gas-liquid separation apparatus. The water circulation apparatus includes a return pipe and a hydrogen exhaust pipe. The return pipe has the on-off valve and connects the water outlet of the water electrolysis apparatus and the gas-liquid separation apparatus.

The hydrogen exhaust pipe has the exhaust valve and is connected to the return pipe between the water outlet and the on-off value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
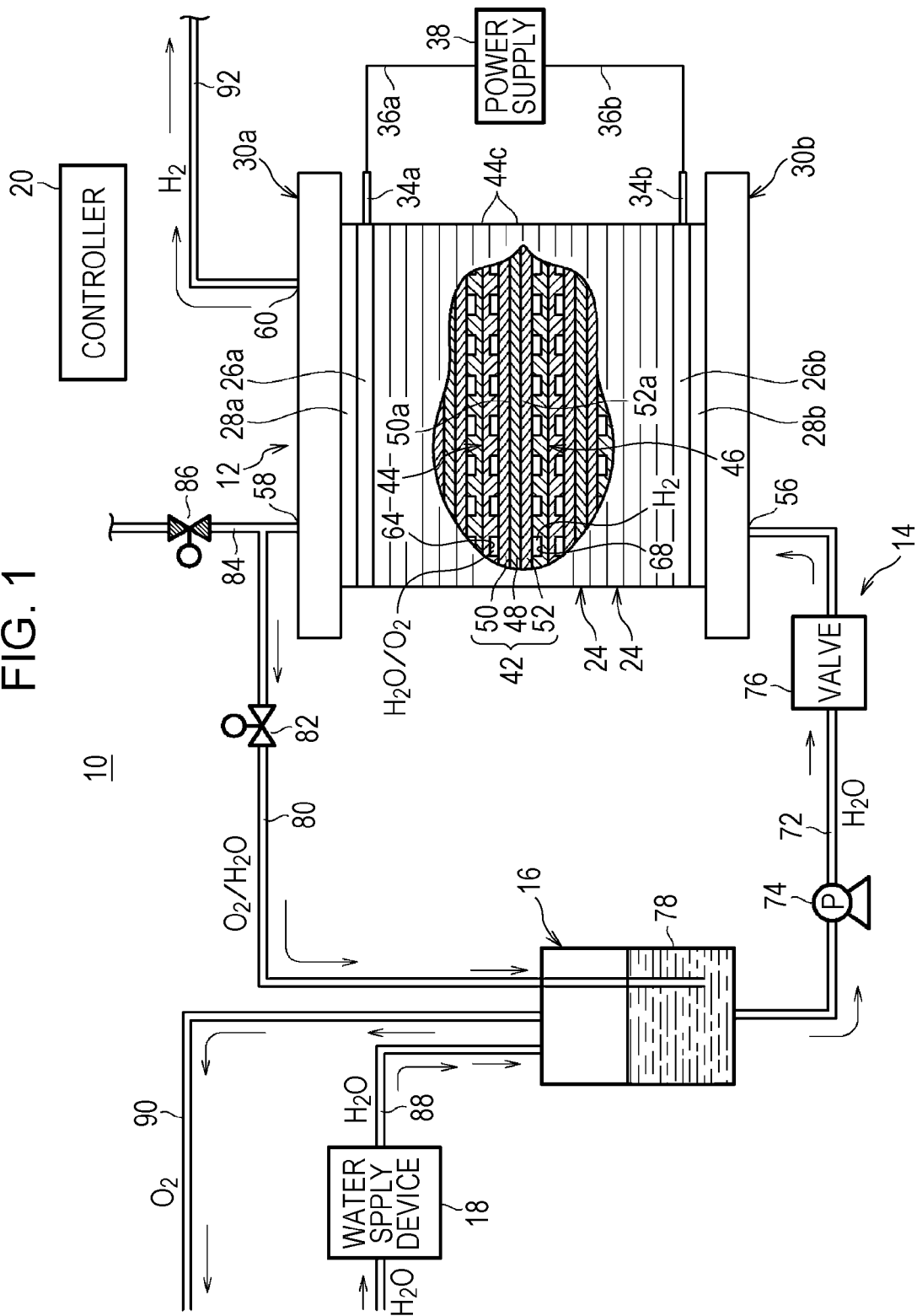
FIG. 1 is a drawing illustrating a schematic configuration of a water electrolysis system according to a first embodiment of the present invention.

The embodiments will now be described with reference to the accompanying drawings, wherein like reference numerals designate corresponding or identical elements throughout the various drawings.

As shown in FIG. 1, a water electrolysis system 10 according to a first embodiment of the present invention includes a water electrolysis apparatus 12 which generates oxygen and high-pressure hydrogen (hydrogen under higher pressure than normal pressure) by electrolysis of water (pure water), a water circulation apparatus 14 which circulates the water in the water electrolysis apparatus 12, a gas-liquid separation apparatus 16 which separates the oxygen and hydrogen (gas components) generated at the water electrolysis apparatus 12 from water in the water circulation apparatus 14 and stores the water, a water supply device 18 which supplies pure water produced from commercial water to the gas-liquid separation apparatus 16, and a controller (control section) 20.

The water electrolysis apparatus 12 includes a stack of a plurality of unit cells 24. In addition, a terminal plate 26a, an insulating plate 28a, and an end plate 30a are disposed at an end in the stack direction of the unit cells 24 in that order toward the outside. Similarly, a terminal plate 26b, an insulating plate 28b, and an end plate 30b are disposed at the other end in the stack direction of the unit cells 24 in that order toward the outside. The unit cells and these plates between the end plates 30a and 30b are fastened to be integrally maintained.

Terminals 34a and 34b are provided on the sides of the terminal plates 26a and 26b, respectively, so as to project outward. The terminals 34a and 34b are electrically connected to a power supply 38 by electric wires 36a and 36b, respectively. The terminal 34a, which is an anode terminal, is connected to the positive terminal of the power supply 38, and the terminal 34b, which is a cathode terminal, is connected to the negative terminal of the power supply 38.

Each of the unit cells 24 includes a disk-shaped electrolyte membrane/electrode assembly 42 and an anode-side separator 44 and a cathode-side separator 46 which sandwich the electrolyte membrane/electrode assembly 42 therebetween. The anode-side separator 44 and cathode-side separator 46 each have a disk shape and are in the form, for example, a carbon plate, or a steel plate, a stainless steel plate, a titanium plate, an aluminum plate, or a plated steel plate, or a metal plate formed by press-forming after anticorrosive surface treatment of a surface or by anticorrosive surface treatment after cutting.

The electrolyte membrane/electrode assembly 42 includes, for example, a solid polymer electrolyte membrane 48 including a perfluorosulfonic acid thin film impregnated with water, and an anode-side power feeder 50 and a cathode-side power feeder 52 provided on both surfaces of the solid polymer electrolyte membrane 48.

Also, an anode electrode catalyst layer 50a and a cathode electrode catalyst layer 52a are formed on both surfaces of the solid polymer electrolyte membrane 48. The anode electrode catalyst layer 50a uses, for example, a Ru (ruthenium-based) catalyst, while the cathode electrode catalyst layer 52a uses, for example, a platinum catalyst.

Each of the anode-side power feeder 50 and the cathode-side power feeder 52 is composed of, for example, a sintered body (porous electrically conductive material) of spherical atomized titanium powder. The anode-side power feeder 50 and the cathode-side power feeder 52 are each provided with a smooth surface portion to be etched after grinding and have a porosity set in the range of 10% to 50%, preferably 20% to 40%.

Further, water supply communicating holes 56 for supplying water (pure water) are provided to communicate with each other in the stacking direction, discharge communicating holes 58 for discharging oxygen produced by reaction and unreacted water (mixed fluid) are provided to communicate with each other in the stacking direction, and hydrogen communicating holes 60 for flowing hydrogen produced by reaction are provided to communicate with each other in the stacking direction, these communicating holes being disposed in the peripheral portions of the unit cells 24.

Further, a first flow passage 64 communicating with the water supply communicating hole 56 and the discharge communicating hole 58 is provided in a surface of the anode-side separator 44, the surface facing the electrolyte member/electrode assembly 42. The first flow passage 64 is provided within a range corresponding to the surface area of the anode-side power feeder 50 and includes a plurality of flow passage grooves or embosses.

Further, a second flow passage 68 communicating with the hydrogen communicating hole 60 is provided in a surface of the cathode-side separator 46, the surface facing the electrolyte member/electrode assembly 42. The second flow passage 68 is provided within a range corresponding to the surface area of the cathode-side power feeder 52 and includes a plurality of flow passage grooves or embosses.

The water circulation apparatus 14 includes a circulation pipe 72 communicating with the water supply communicating holes 56 of the water electrolysis apparatus 12. The circulation pipe 72 is connected to the bottom of a tank portion 78, which constitutes the gas-liquid separation apparatus 16, a circulating pump 74 and a valve for inhibiting a backflow of water, for example, a check valve 76, being disposed on the circulation pipe 72. One of the ends of a return pipe 80 communicates with the top of the tank portion 78, and the other end of the return pipe 80 communicates with the discharge communicating holes 58 of the water electrolysis apparatus 12.

In addition, an on-off valve, for example, a solenoid valve 82, is disposed on the return pipe 80, and a hydrogen exhaust pipe 84 is connected between the discharge communicating holes 58 serving as a water discharge port of the water electrolysis apparatus 12 and the solenoid valve 82 so as to extend upward from the water electrolysis apparatus 12. An exhaust valve, for example, an exhaust solenoid valve 86, is disposed on the hydrogen exhaust pipe 84. The exhaust solenoid valve 86 may be a safety valve or a back pressure regulating valve.

A pure water supply pipe 88 connected to the water supply device 18 and an oxygen exhaust pipe 90 for exhausting oxygen separated from the pure water in the tank portion 78 are connected to the tank portion 78.

Further, one of the ends of a high-pressure hydrogen pipe 92 is connected to the hydrogen communicating holes 60 of the water electrolysis apparatus 12, and the other end of the high-pressure hydrogen pipe 92 is connected to a high-pressure hydrogen supply portion (a fuel tank or the like) through a back pressure regulating valve (not shown).

An operation of the water electrolysis system 10 configured as described above is described below.

First, pure water produced from commercial water is supplied to the tank portion 78, which constitutes the gas-liquid separation apparatus 16, through the water supply device 18. On the other hand, in the water circulation apparatus 14, water in the tank portion 78 is supplied to the water supply communicating holes 56 of the water electrolysis apparatus 12 through the circulation pipe 72 under the operation of the circulating pump 74. In addition, a voltage is applied across the terminal portions 34a and 34b of the terminal plates 26a and 26b through the power supply 38 electrically connected thereto.

Accordingly, in each of the unit cells 24, water is supplied to the first flow passage 64 of the anode-side separator 44 from the water supply communicating hole 56, and the water moves through the anode-side power feeder 50. Therefore, the water is electrically decomposed in the anode electrode catalyst layer 50a to generate hydrogen ions, electrons, and oxygen. The hydrogen ions produced by the anodic reaction permeate through the solid polymer electrolyte membrane 48, move to the cathode electrode catalyst layer 52a, and combine with electrons to generate hydrogen.

Consequently, hydrogen flows along the second flow passage 68 formed between the cathode-side separator 46 and the cathode-side power feeder 52. The hydrogen is maintained at a higher pressure than that in the water supply communicating holes 56 and flows through the hydrogen communicating holes 60 and thus can be taken out to the outside of the water electrolysis apparatus 12 through the high-pressure hydrogen pipe 92.

On the other hand, the oxygen produced by reaction and unreacted water flow through the first flow passage 64, and this mixed fluid is discharged to the return pipe 80 of the water circulation apparatus 14 along the discharge communicating holes 58. The unreacted gas water and oxygen are introduced into the tank portion 78 and subjected to gas-liquid separation. Then, water is introduced into the water supply communicating holes 56 of the water electrolysis apparatus 12 from the circulation pipe 72 through the circulating pump 74. The oxygen separated from the water is discharged to the outside through the oxygen exhaust pipe 90.

Figure 2:
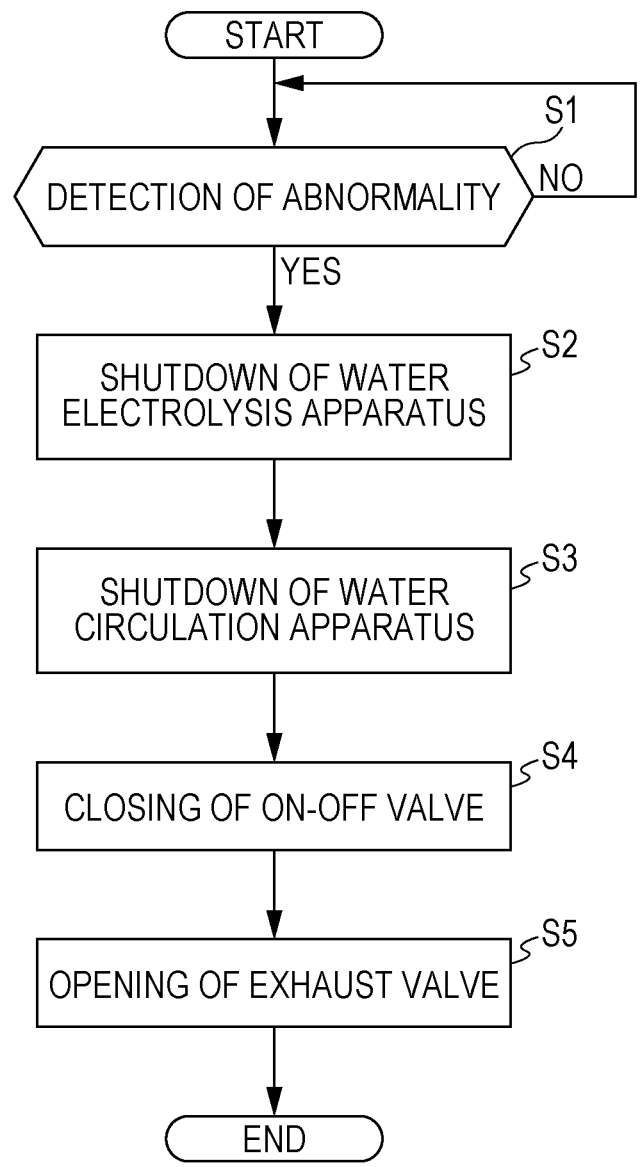
FIG. 2 is a flowchart illustrating a method for shutting down the water electrolysis system shown in FIG. 1.

Next, a shutdown method according to the first embodiment is described according to a flowchart shown in FIG. 2.

During an operation of the water electrolysis system 10, when an abnormality is detected ("YES" in Step S1), the operation proceeds to Step S2. Here, "abnormality detection" represents that the occurrence of abnormal stopping other than steady stopping in the water electrolysis system 10 is detected. Specifically, "abnormality detection" represents the occurrence of a pressure abnormality, temperature abnormality, or hydrogen concentration abnormality in the water electrolysis system 10, a water level abnormality in the gas-liquid separation apparatus 16, or the like.

When the abnormality is detected, the controller 20 shuts down the water electrolysis apparatus 12 (Step S2) and, at the same time, shuts down the circulating pump 74 constituting the water circulation apparatus 14 (Step S3). Further, the solenoid valve (on-off valve) 82 is closed (Step S4), while the exhaust solenoid valve (exhaust valve) 86 is opened (Step S5). The Steps S2 to S5 are preferably simultaneously performed.

Figure 3:
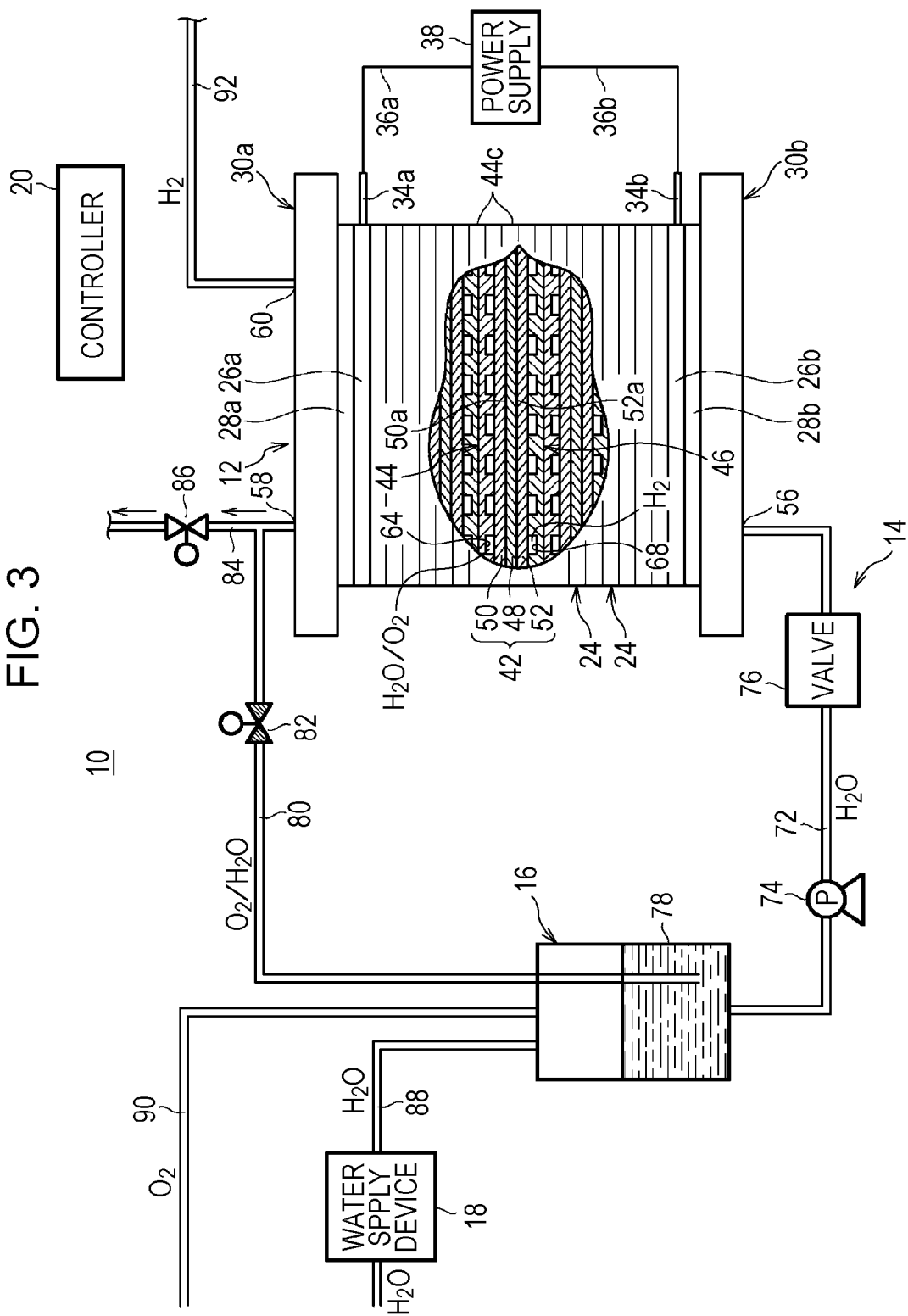
FIG. 3 is a drawing illustrating an operation of the water electrolysis system.

Therefore, as shown in FIG. 3, the discharge communicating holes 58 of the water electrolysis apparatus 12 are cut off from the gas-liquid separation apparatus 16 but communicated with the hydrogen exhaust pipe 84. In addition, hydrogen is generated in the second flow passage 68, and the second flow passage 68 is set to a higher pressure than that in the first flow passage 64 in which oxygen is generated. Thus, the high-pressure hydrogen remaining in the second flow passage 68 easily permeates through the solid polymer electrolyte membrane 48 and moves to the first flow passage 64.

The hydrogen which moves to the first flow passage 64 moves to the hydrogen exhaust pipe 84 from the discharge communicating holes 58 of the water electrolysis apparatus 12. Consequently, the hydrogen is discharged to a hydrogen exhaust processing portion (for example, a diluter) (not shown) through the hydrogen exhaust pipe 84.

The check valve 76 is disposed in the circulation pipe 72 so that even when the circulating pump 74 is turned off, water does not flow back to the circulation pipe 72 from the water supply communicating holes 56 of the water electrolysis apparatus 12. In addition, when a solenoid valve or the like is used in place of the check valve 76, it is necessary to turn off the circulating pump 74 and, at the same time, turn off (close) the solenoid valve.

In the first embodiment, as described above, when the water electrolysis apparatus 12 is shut down, the solenoid valve 82 is closed. Therefore, hydrogen permeated to the first flow passage 64 (anode side) is discharged to the hydrogen exhaust pipe 84 connected between the solenoid valve 82 and the discharge communicating holes 58 of the water electrolysis apparatus 12.

Therefore, pressure release from the second flow passage 68 (cathode side) is smoothly performed, thereby suppressing damage to a seal and MEA and preventing the permeated hydrogen remaining on the anode side from being discharged from an unexpected position. In addition, a high-pressure resistant structure is not required for the anode side, thereby causing an economical advantage.

Thus, it is possible to securely remove hydrogen remaining on the anode side by a simple configuration and process during shutdown and achieve the effect of permitting efficient water electrolysis.

Figure 4:
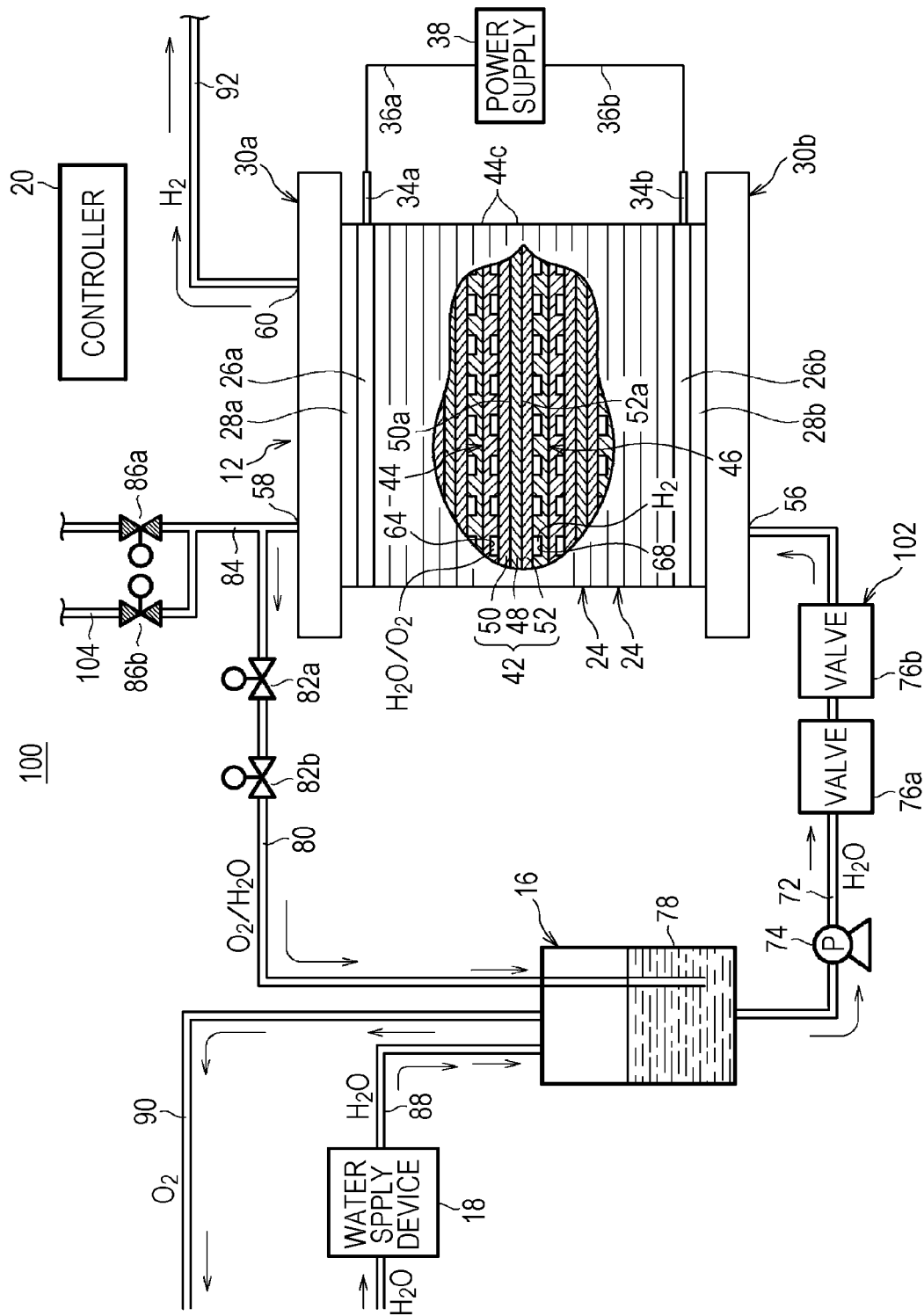
FIG. 4 is a drawing illustrating a schematic configuration of a water electrolysis system according to a second embodiment of the present invention.

FIG. 4 is a drawing illustrating a schematic configuration of a water electrolysis system 100 according to a second embodiment of the present invention. The same components as the water electrolysis system 10 according to the first embodiment are denoted by the same reference numerals, and a detailed description thereof is omitted.

The water electrolysis system 100 is provided with a water circulation apparatus 102 in which a first check valve 76a and a second check valve 76b are disposed in series in the circulation pipe 72. Also, on-off valves, for example, a first solenoid valve 82a and a second solenoid valve 82b, are disposed in series in the return pipe 80.

A branch pipe 104 is provided on the hydrogen exhaust pipe 84, and exhaust valves, for example, a first exhaust solenoid valve 86a and a second exhaust solenoid valve 86b, are disposed in parallel in the hydrogen exhaust pipe 84 and the branch pipe 104.

In the second embodiment configured as described above, the first check valve 76a and the second check valve 76b are disposed in series, and the first solenoid valve 82a and the second solenoid valve 82b are disposed in series. Further, the first exhaust solenoid valve 86a and the second exhaust solenoid valve 86b are disposed in parallel. Therefore, the effect of permitting more secured control of the water electrolysis system 100 is exhibited.

According to the embodiment of the present invention, when the water electrolysis system is shut down, the on-off valve is closed, and thus hydrogen permeated to the anode side is discharged to the hydrogen exhaust pipe connected between the on-off valve and the water outlet of the water electrolysis apparatus. Therefore, pressure release from the cathode side is smoothly performed, thereby suppressing damage to a seal and MEA and preventing permeated hydrogen remaining on the anode side from being discharged from an unexpected position. In addition, a high-pressure resistant structure is not required for the anode side, thereby causing an economical advantage.

Therefore, it is possible to securely remove hydrogen remaining on the anode side by a simple configuration and process during shutdown and to perform efficient water electrolysis.

Obviously, numerous modifications and variations of the present invention are possible in light of the above teachings. It is therefore to be understood that within the scope of the appended claims, the invention may be practiced otherwise than as specifically described herein.

What is claimed is:

1. A method for shutting down a water electrolysis system including a water electrolysis apparatus, a gas-liquid separation apparatus, and a water circulation apparatus, the water electrolysis apparatus including a power supply, an anode connected to the power supply, a cathode connected to the power supply, and an electrolyte membrane provided between the anode and the cathode, the water electrolysis apparatus being configured to generate oxygen on a side of the anode side and to generate hydrogen on a side of the cathode at a pressure higher than a pressure of the oxygen through electrolysis of water, the gas-liquid separation apparatus separating unreacted water and produced gas discharged from a water outlet of the water electrolysis apparatus, the water circulation apparatus circulating the water between the water electrolysis apparatus and the gas-liquid separation apparatus, the water circulation apparatus including a return pipe having an on-off valve and connecting the water outlet of the water electrolysis apparatus and the gas-liquid separation apparatus, and a hydrogen exhaust pipe having an exhaust valve and being connected to the return pipe between the water outlet and the on-off value, the method comprising:

shutting down the water electrolysis apparatus while shutting down the water circulation apparatus;
   closing the on-off valve while opening the exhaust valve; and
   transmitting hydrogen generated in the cathode to the anode through the electrolyte membrane, and then exhausting hydrogen through the exhaust valve to release pressure in the cathode.

2. The method for shutting down the water electrolysis system according to claim 1, wherein the shutting step and the closing step are simultaneously performed.

3. The method for shutting down the water electrolysis system according to claim 2, wherein the shutting step and the closing step are performed when stopping other than steady stopping occurs in the water electrolysis system.

4. The method for shutting down the water electrolysis system according to claim 1, wherein the shutting step and the closing step are performed when stopping other than steady stopping occurs in the water electrolysis system.

* * * * *